United States Patent
Mossoba et al.

(10) Patent No.: US 12,555,408 B2
(45) Date of Patent: Feb. 17, 2026

(54) METHOD AND SYSTEM FOR CUSTOMIZING USER EXPERIENCE

(71) Applicant: CAPITAL ONE SERVICES, LLC, McLean, VA (US)

(72) Inventors: Michael Mossoba, Arlington, VA (US); Gaurang J. Bhatt, Hendron, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/519,890

(22) Filed: Nov. 27, 2023

(65) Prior Publication Data
US 2024/0096129 A1   Mar. 21, 2024

Related U.S. Application Data

(63) Continuation of application No. 17/134,631, filed on Dec. 28, 2020, now Pat. No. 11,830,287, which is a continuation of application No. 16/679,613, filed on Nov. 11, 2019, now Pat. No. 10,878,223, which is a
(Continued)

(51) Int. Cl.
| | |
|---|---|
| G06V 20/52 | (2022.01) |
| G06Q 20/28 | (2012.01) |
| G06Q 20/38 | (2012.01) |
| G06Q 30/0202 | (2023.01) |
| G06V 40/16 | (2022.01) |

(52) U.S. Cl.
CPC ........... *G06V 40/169* (2022.01); *G06Q 20/28* (2013.01); *G06Q 20/389* (2013.01); *G06Q 30/0202* (2013.01); *G06V 20/52* (2022.01)

(58) Field of Classification Search
CPC .... G06Q 20/28; G06Q 20/108; G06Q 20/389; G06Q 30/0202; G06V 20/52; G06V 40/169; G06V 40/172
See application file for complete search history.

(56) References Cited

U.S. PATENT DOCUMENTS

| | | |
|---|---|---|
| 5,774,868 A | 6/1998 | Cragun et al. |
| 6,622,125 B1 | 9/2003 | Cragun et al. |
| 8,352,315 B2 | 1/2013 | Faith et al. |
(Continued)

FOREIGN PATENT DOCUMENTS

| | | |
|---|---|---|
| CA | 2619667 A1 | 11/2000 |
| CA | 2784321 A1 | 6/2011 |
| JP | 2010002962 A1 | 1/2010 |

*Primary Examiner* — Carol W Chan
(74) *Attorney, Agent, or Firm* — Foley & Lardner LLP

(57) ABSTRACT

Embodiments disclosed herein generally related to a method and system for customizing a customer experience. In one embodiment, a method is provided herein. A computing system receives from a computing device positioned in a facility one or more video streams. The one or more video streams capture a customer in the facility. The computing system identifying an identity of the customer by parsing the one or more video streams to identify one or more audio or visual cues of the customer. The computing system determines, based on the identity of the customer, that the customer has one or more previous transactions at the facility. The computing system predicts, based on the one or more previous transactions, a new transaction at the facility. The computing system notifies the computing device positioned in the facility in preparation of the new transaction.

20 Claims, 4 Drawing Sheets

Related U.S. Application Data continuation of application No. 16/256,617, filed on Jan. 24, 2019, now Pat. No. 10,509,949.

(56) References Cited

U.S. PATENT DOCUMENTS

| | | |
|---|---|---|
| 9,911,290 B1 | 3/2018 | Zalewski et al. |
| 10,373,248 B1 | 8/2019 | Casey et al. |
| 10,417,650 B1 | 9/2019 | Gong |
| 2002/0010622 A1 | 1/2002 | Okamoto et al. |
| 2004/0230535 A1 | 11/2004 | Binder et al. |
| 2005/0189414 A1 | 9/2005 | Fano et al. |
| 2005/0189415 A1 | 9/2005 | Fano et al. |
| 2008/0249870 A1 | 10/2008 | Angell et al. |
| 2010/0280880 A1 | 11/2010 | Faith et al. |
| 2011/0125565 A1 | 5/2011 | MacIlwaine et al. |
| 2012/0030006 A1* | 2/2012 | Yoder ............... G06Q 30/0207 705/14.41 |
| 2014/0052554 A1 | 2/2014 | Abraham |
| 2015/0095216 A1 | 4/2015 | Van Heerden et al. |
| 2015/0294322 A1 | 10/2015 | Grigg et al. |
| 2016/0110799 A1* | 4/2016 | Herring ................. G06F 18/24 705/26.81 |
| 2016/0300181 A1 | 10/2016 | Iwai et al. |
| 2017/0323345 A1 | 11/2017 | Flowers et al. |
| 2018/0240089 A1 | 8/2018 | Okamoto |
| 2019/0026909 A1 | 1/2019 | Itoh et al. |
| 2020/0104593 A1 | 4/2020 | Zucker et al. |
| 2020/0104594 A1 | 4/2020 | Zucker et al. |
| 2020/0167794 A1* | 5/2020 | Mathews ............ G06V 40/172 |

\* cited by examiner

METHOD AND SYSTEM FOR CUSTOMIZING USER EXPERIENCE

CROSS-REFERENCE TO RELATED APPLICATION INFORMATION

This is a continuation of U.S. patent application Ser. No. 17/134,631, filed Dec. 28, 2020, which is a continuation of U.S. patent application Ser. No. 16/679,613, filed Nov. 11, 2019, now U.S. Pat. No. 10,878,223, issued Dec. 29, 2020, which is a continuation of U.S. patent application Ser. No. 16/256,617, filed Jan. 24, 2019, now U.S. Pat. No. 10,509,949, issued Dec. 17, 2019, which are incorporated herein by reference in their entireties.

FIELD OF THE DISCLOSURE

The present disclosure generally relates to a method and a system for customizing a user experience.

BACKGROUND

When customers visit their frequently visited facilities, often those customers transact similarly to past transactions that each facility. For example, when a customer visits a particular local restaurant, the customer may frequently order one or two items each time. During busy hours for the facility, for example, frequent customers may become frustrated by long lines and preparation times, despite being a dedicated customer to the facility. Further, because the customer has typically performed the same transaction at this particular facility, once a customer enters the facility, it should be easy for the facility to recognize the customer and the customer's "usual" order. However, due to the turn-over rate at such facilities, as well as the movement away from human employees for electronic point-of-sale terminals, the historical concept of a "usual customer" is quickly being eliminated as a result of unfamiliarity with staff and impersonalization of technology.

SUMMARY

In one embodiment, a method of customizing a customer experience is disclosed herein. A computing system receives from computing device positioned in a facility one or more first video streams captured by a first camera positioned at an entrance of the facility. The one or more first video streams capture a customer in the facility. The computing system identifies an identity of the customer by parsing the one or more first video streams to identify one or more audio or visual cues of the customer. The computing system determines, based on the identity of the customer, that the customer has one or more previous transactions at the facility. The computing system analyzes the one or more previous transactions at the facility to identify a transaction pattern at the facility. The computing system predicts, based on the identified transaction pattern in the one or more previous transactions, a new transaction at the facility. The computing system receives, from the computing device positioned in the facility, one or more second video streams captured by a second camera positioned at a point-of-sale terminal in the facility. The computing system parses the one or more second video streams to confirm that the customer remains in the facility. The computing system notifies the computing device positioned in the facility in preparation of the new transaction.

In some embodiments, the computing system further determines that the customer has pre-authorized payment from a customer account. The computing system notifies the computing device positioned in the facility of the pre-authorized payment.

In some embodiments, analyzing the one or more previous transactions at the facility to identify a transaction pattern at the facility includes, the computing system identifying a day of the week and time of day each the previous transaction occurred, for each previous transaction of the one or more previous transactions at the facility.

In some embodiments, wherein predicting, based on the one or more previous transactions, a new transaction at the facility includes the computing system identifying a current day of the week. The computing system identifies a current time of the current day. The computing system generates a prediction based on the identified transaction pattern in one or more previous transactions, the current day of the week, and the current time of the current day.

In some embodiments, the computing system further receives a confirmation from the customer in response to the customer viewing a confirmation message at a point-of-sale terminal. The computing system transmits the confirmation to the computing device positioned in the facility.

In some embodiments, identifying the identity of the customer by parsing the one or more video streams to identify one or more audio or visual cues of the customer includes the computing system analyzing one or more facial features of the customer. The computing system determines the identity of the customer based on the one or more facial features.

A computing system receives from a computing device positioned in a facility one or more video streams. The one or more video streams capture a customer in the facility. The computing system identifying an identity of the customer by parsing the one or more video streams to identify one or more audio or visual cues of the customer. The computing system determines, based on the identity of the customer, that the customer has one or more previous transactions at the facility. The computing system predicts, based on the one or more previous transactions, a new transaction at the facility. The computing system notifies the computing device positioned in the facility in preparation of the new transaction.

In some embodiments, the computing system further determines determining that the customer has pre-authorized payment from a customer account. The computing system notifies notifying the computing device positioned in the facility of the pre-authorized payment.

In some embodiments, predicting, based on the one or more previous transactions, a new transaction at the facility includes the computing system identifying a current day of the week. The computing system identifies a current time of the current day. The computing system generates a prediction based on the one or more previous transactions, the current day of the week, and the current time of the current day.

In some embodiments, receiving, from the computing device positioned in the facility, one or more video streams includes the computing system receiving a first video stream from a first camera positioned at an entrance of the facility.

In some embodiments, the computing system further receives a second video stream from a second camera positioned at a point-of-sale terminal in the facility.

In some embodiments, the computing system further receives a confirmation from the customer in response to the customer viewing a confirmation message at a point-of-sale terminal. The computing system transmits the confirmation to the computing device positioned in the facility.

In some embodiments, identifying the identity of the customer by parsing the one or more video streams to identify one or more audio or visual cues of the customer includes the computing system analyzing one or more facial features of the customer. The computing system determines the identity of the customer based on the one or more facial features.

In another embodiment, a system is disclosed herein. The system includes a processor and a memory. The memory has programming instructions stored thereon, which, when executed by the processor, performs an operation. The operation includes receiving, from a computing device positioned in a facility, one or more video streams, the one or more video streams capturing a customer in the facility. The operation further includes identifying an identity of the customer by parsing the one or more video streams to identify one or more audio or visual cues of the customer. The operation further includes determining, based on the identity of the customer, that the customer has one or more previous transactions at the facility. The operation further includes predicting, based on the one or more previous transactions, a new transaction at the facility. The operation further includes notifying the computing device positioned in the facility in preparation of the new transaction.

In some embodiments, the operation further includes determining that the customer has pre-authorized payment from a customer account. The operation further includes notifying the computing device positioned in the facility of the pre-authorized payment.

In some embodiments, predicting, based on the one or more previous transactions, a new transaction at the facility includes identifying a current day of the week, identifying a current time of the current day, and generating a prediction based on the one or more previous transactions, the current day of the week, and the current time of the current day.

In some embodiments, receiving, from the computing device positioned in the facility, one or more video streams, the one or more video streams capturing the customer in the facility includes receiving a first video stream from a first camera positioned at an entrance of the facility.

In some embodiments, the operation further includes receiving a second video stream from a second camera positioned at a point-of-sale terminal in the facility.

In some embodiments, the operation further includes receiving a confirmation from the customer in response to the customer viewing a confirmation message at a point-of-sale terminal. The operation further includes transmitting the confirmation to the computing device positioned in the facility.

In some embodiments, identifying the identity of the customer by parsing the one or more video streams to identify one or more audio or visual cues of the customer includes analyzing one or more facial features of the customer and determining the identity of the customer based on the one or more facial features.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein are generally directed to a method and a system for customizing customer experiences. When a customer walks into a facility (e.g., local shop, restaurant, etc.), customers typically make similar or the same transaction at the facility as they previously made. For example, when a customer walks into a particular restaurant, the customer is likely to order either "harvest bowl" or "guacamole greens."

The one or more techniques disclosed herein are directed to customizing a customer experience at a facility. In particular, the one or more techniques disclosed herein generally relate to a computing system that tracks a customer's transaction history at one or more facilities, and generates a predicted transaction for the customer upon detecting the customer arriving at or within a given facility. For example, the one or more techniques disclosed herein leverage one or more cameras to track customer activity in a facility, as well as one or more point-of-sale terminals in the facility, to generate a "cookie" for the customer that creates a record of each transaction at each facility. Based on the customer's transaction history (i.e., collection of cookies), the system disclosed herein is able to predict a customer's transaction upon detecting a customer at a particular facility. For example, the system may leverage the one or more cameras and facial recognition software to identify when the customer arrives (or is inside) the facility.

By accurately predicting a customer's transaction based on the customer's transaction history, the system can communicate with the facility, such that the facility may begin preparation of the customer's transaction. Such anticipatory operation helps improve the customer throughput at the facility, and therefore the profitability of the facility.

Figure 1:
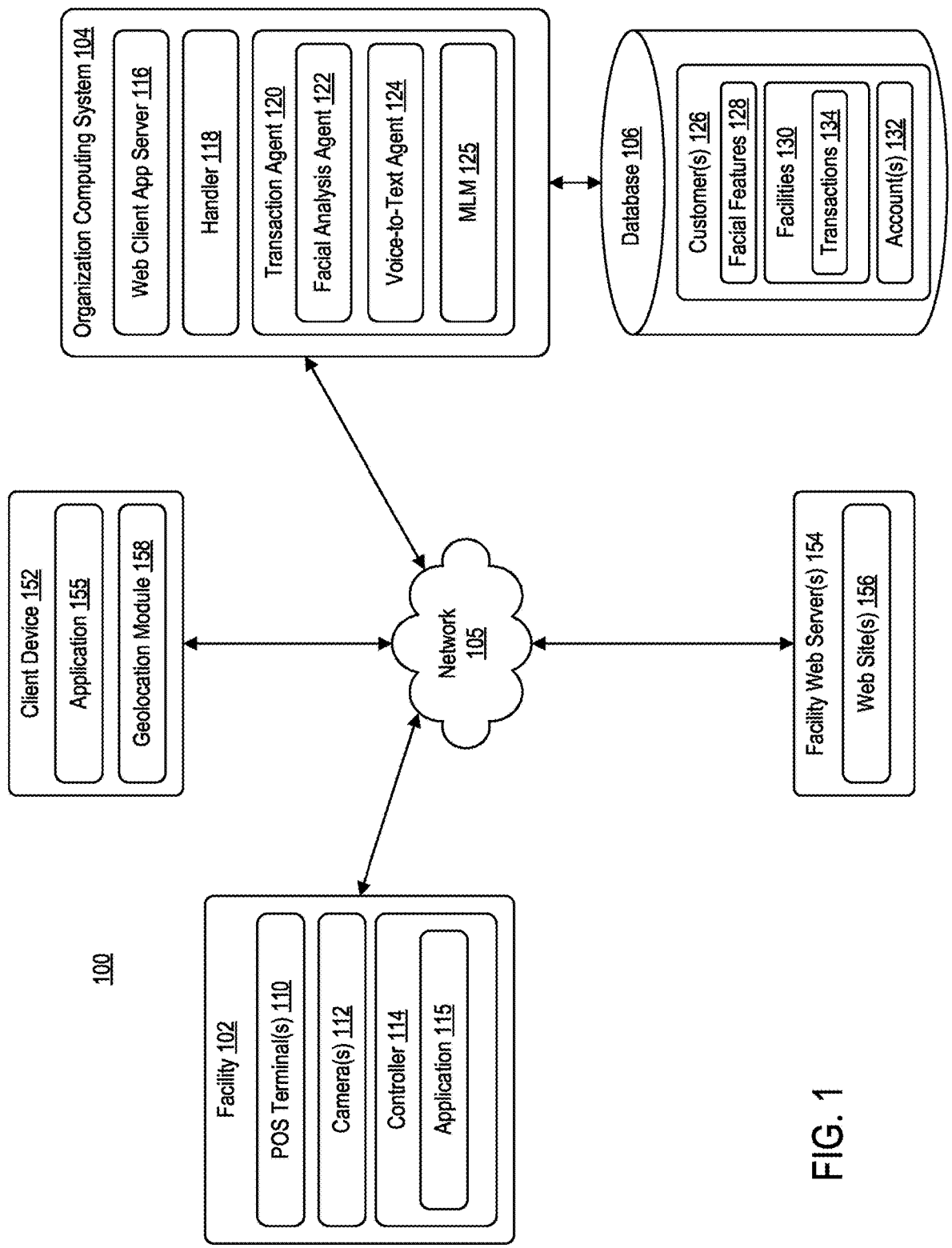
FIG. 1 is a block diagram illustrating a computing environment, according to one exemplary embodiment.

Such embodiments are not to be limited to food service facilities. Such exemplary facilities may include, but are not limited to, movie theatres (e.g., the present system may be configured to suggest movies based on user experience and time), clothing stores (e.g., the present system may be configured to suggest clothes based on size and prior orders), book stores (e.g., the present system may be configured to suggest books based on past user preferences), and similar facilities through which the present system can leverage past FIG. 1 is a block diagram illustrating a computing environment 100, according to one embodiment. Computing environment 100 may include at least a facility 102 and an organization computing system 104 communicating via network 105. In some embodiments, computing environment 100 may further include a client device 152 and a facility web server 154 communicating with facility 102 and organization computing system 104 via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receiving information between the components of system 100.

Facility 102 may be representative of a business or organization associated with organization computing system 104. Exemplary businesses or organizations may include, but are not limited to, restaurants, coffee shops, donut shops, gas stations, and the like. Facility 102 may include one or more point-of-sale (POS) terminals 110, one or more cameras 112, and a controller 114. POS terminals 110 may be configured to interface with a customer to facilitate the ordering and payment of goods and/or services. In some embodiments, each POS terminal 110 may be configured to interface with a payment device of a customer. Such payment devices may include, a mobile device, a credit card, a debit card, a gift card, and the like. In some embodiments, each POS terminal 110 may be configured to receive one or more banknotes as a form of payment.

In some embodiments, one or more POS terminals 110 may be operated by an employee of facility 102. For example, employee at a POS terminal 110 may enter a customer's transaction and facilitate payment between the customer and the organization via POS terminal 110. In some embodiments, one or more POS terminals 110 may be operated by the customer. For example, the customer may be provided with a "self-serve" option, in which the customer can enter his or her transaction via a display device and provide payment via POS terminal 110, without any interaction from the employee.

Each POS terminal 110 may be representative of a general purpose computing device programmed to receive transactions from one or more customers and facilitate payment between the one or more customers and facility 102.

One or more cameras 112 may be configured to monitor one or more customers throughout facility 102. One or more cameras 112 may be configured to monitor one or more customers as each customer enters and exits facility 102. In some embodiments, one or more cameras 112 may be configured to track a duration in which one or more customers at facility 102. In some embodiments, one or more cameras 112 may be configured to monitor customer transaction habits. Generally, one or more cameras 112 may be configured to track customer movement and habits throughout facility 102.

Controller 114 may be configured to manage one or more POS terminals 110 and one or more cameras 112. For example, controller 114 may be configured to communicate with each POS terminal 110 and each camera 112 via a local network (not shown). Local network may be substantially similar to network 105. Controller 114 may be configured to aggregate one or more streams of data captured by one or more cameras 112. Controller 114 may further be configured to receive one or more sets of transaction information transmitted by POS terminals 110. As such, controller 114 may be configured to collect and/or aggregate customer information captured by one or more cameras 112 and one or more POS terminals 110.

Controller 114 may be configured to communicate with organization computing system 104 via network 105. For example, controller 114 may include an application 115 executing thereon that facilitates communication between controller 114 and organization computing system 104. Application 115 may be representative of a web browser that allows access to a website or a stand-alone application. Controller 114 may access application 115 to access functionality of organization computing system 104. Controller 114 may communicate over network 105 with web client application server 114 of organization computing system 104. For example, client device 102 may be configured to execute application 115 to access one or more functionalities of organization computing system 104.

Organization computing system 104 may include at least handler 118 and transaction agent 120. Both handler 118 and transaction agent 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Handler 118 may be configured to manage information stored in database 106. For example, handler 118 may be configured to update client information in database 106 when prompted by a customer, when prompted by employees of the facility, or when prompted by another component of organization computing system 104.

Transaction agent 120 may be configured to predict a customer transaction prior to a customer arriving at, for example, a POS terminal 110. Transaction agent 120 may include a facial analysis agent 122, a voice-to-text agent 124, and a machine learning module 125. Facial analysis agent 122 may be configured to identify one or more users (or customers) using one or more video streams received from one or more cameras 112 positioned therein. Facial analysis agent 122 may be configured to parse through one or more video streams in real-time, to identify one or more customers arriving at (or already inside) facility 102, based on previously identified facial features stored in database 106. For example, in some embodiments, facial analysis agent 122 may match a customer's face to a customer in database 106 using three dimensional facial recognition methodologies. In another example, facial analysis agent 122 may match a customer's face to a customer in database 106 using a skin texture analysis methodology. In another example, facial analysis agent 122 may match a customer's face to a customer in database 106 using a combination of three-dimensional facial recognition and skin texture analysis.

Voice-to-text agent 124 may be configured to translate audible utterances of a customer to text for further analysis by transaction agent 120. In some embodiments, each POS terminal 110 may include a microphone to capture communications between a customer and an employee operation POS terminal 110. In some embodiments, cameras 112 may be configured to monitor POS terminals 110, such that cameras 112 may capture communications between a customer and an employee (or another customer) at facility 102. Voice-to-text agent 124 may include software configured to provide text-based descriptions of audible input. Transaction agent 120 may parse the text-based description to identify one or more details of a customer's transaction at facility 102.

Machine learning module 125 may include one or more computer systems configured to train a prediction model used by transaction agent 120 to predict details of a customer's future transaction. To train the prediction model, machine learning module 125 may receive, as input, one or more streams of customer activity. The one or more streams of customer activity may correspond to previous transaction at given facilities. Such streams of activity may include the facility, the time of day, the day of the week, items purchased during the transaction, and the like. In some embodiments, machine learning module 125 may further receiver, as input, one or more streams of activity associated with additional customers. As such, machine learning module 125 may leverage both customer specific and customer agnostic information to predict details of a customer's transaction when, for example, the customer arrives at facility 102. Machine learning module 125 may implement one or more machine learning algorithms to train the prediction model. For example, machine learning module 125 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like.

Organization computing system 104 may be in communication with database 106. Database 106 may be configured to store information associated with one or more customers. For example, handler 118 may be configured to generate one or more customer profiles 126, for each customer that accesses a given facility 102. Customer profiles 126 may include facial features 128, facilities 130, and account(s) 132.

Facial features 128 may correspond to those features identified by facial analysis agent 122 as distinguishing features of a customer's face. Accordingly, when organization computing system 104 receives one or more streams of customer activity in facility 102, facial analysis agent 122 may query database 106 to compare facial features identified in the one or more streams of customer activity to one or more stored facial features 128.

Facilities 130 may include a list of facilities 102 visited by a particular customer. Each facility 130 may include one or more transactions 134. Each transaction 134 may include one or more details of a particular transaction at facility 130. Such details may include, but are not limited to, day of the week, time of day, items purchased during the transaction, services rendered, means of payment, and the like.

Accounts 132 may include one or more financial accounts linked to a customer profile 126. For example, a customer may have the ability to pre-approve automatic payment through by transaction agent 120, when transaction agent 120 successfully identifies that customer has entered facility 102. In some embodiments, a customer may have the ability to pre-approve payment from account 132, prior to transaction agent 120 submitting a payment transfer request from a financial institution associated with account 132. Such accounts 132 may include, but are not limited to, checking account, pre-paid account, savings account, and the like.

Client device 152 may be operated by a customer (or user). For example, client device 102 may be a mobile device, a tablet, a desktop computer, or any computing system having the capabilities described herein. Client device 152 may belong to or be provided to a customer or may be borrowed, rented, or shared. Customers may include individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 152 may include at least application 155 executing thereon that facilitates communication between client device 152 and one or more facility web servers 154. Application 155 may be representative of a web browser that allows access to a website or a stand-alone application. Client device 152 may access application 155 to access functionality of facility web servers 154. For example, client device 152 may be configured to execute application 155 to access one or more functionalities of one or more facility web servers 154.

Each facility web server 154 may correspond to a respective facility 102. Each facility web server 154 may be configured to manage one or more web sites associated therewith. For example, assuming that facility 102 is a movie theatre, web server 154 may host a movie theatre web site 156 through which customers can buy tickets or access a customer profiler managed by web server 154.

In some embodiments, a particular customer may be part of a loyalty program associated with a particular facility 102. Through the loyalty program, the customer may receive one or more updates via application 155 executing on client device 152. For example, facility web server 154 associated with facility 102 may prompt application 155 to push a notification to the customer, prompting the customer to confirm whether the customer is indeed within facility 102. In another example, facility web server 154 associated with facility 102 may prompt application 155 to push a notification to the customer, prompting the customer to confirm whether the predicted transaction (generated by transaction agent 120) is correct.

Further, in some embodiments, application 155 may allow customer to view and edit past transactions at a particular facility 102. For example, via application 155, client device 152 may interface with facility's website 156 to provide one or more transaction preferences. Web site 156 may, in turn, interface with organization computing system 104 to update a customer profile 126 with the one or more transaction preferences, accordingly.

Still further, in some embodiments, client device 152 may include a geolocation module 158 executing thereon. Geolocation module 158 may be configured to track a current location of client device 152. In some embodiments, organization computing system 104 may leverage geolocation module 158 to confirm whether the customer is indeed within or near facility 102. For example, client device 152 may enable location services for web site 156 (or application 155), such that facility web server 154 may leverage geolocation module 158 to identify a current location of the customer. Facility web server 154 may, in turn, relay the location information to organization computing system 104 for further analysis.

Figure 2:
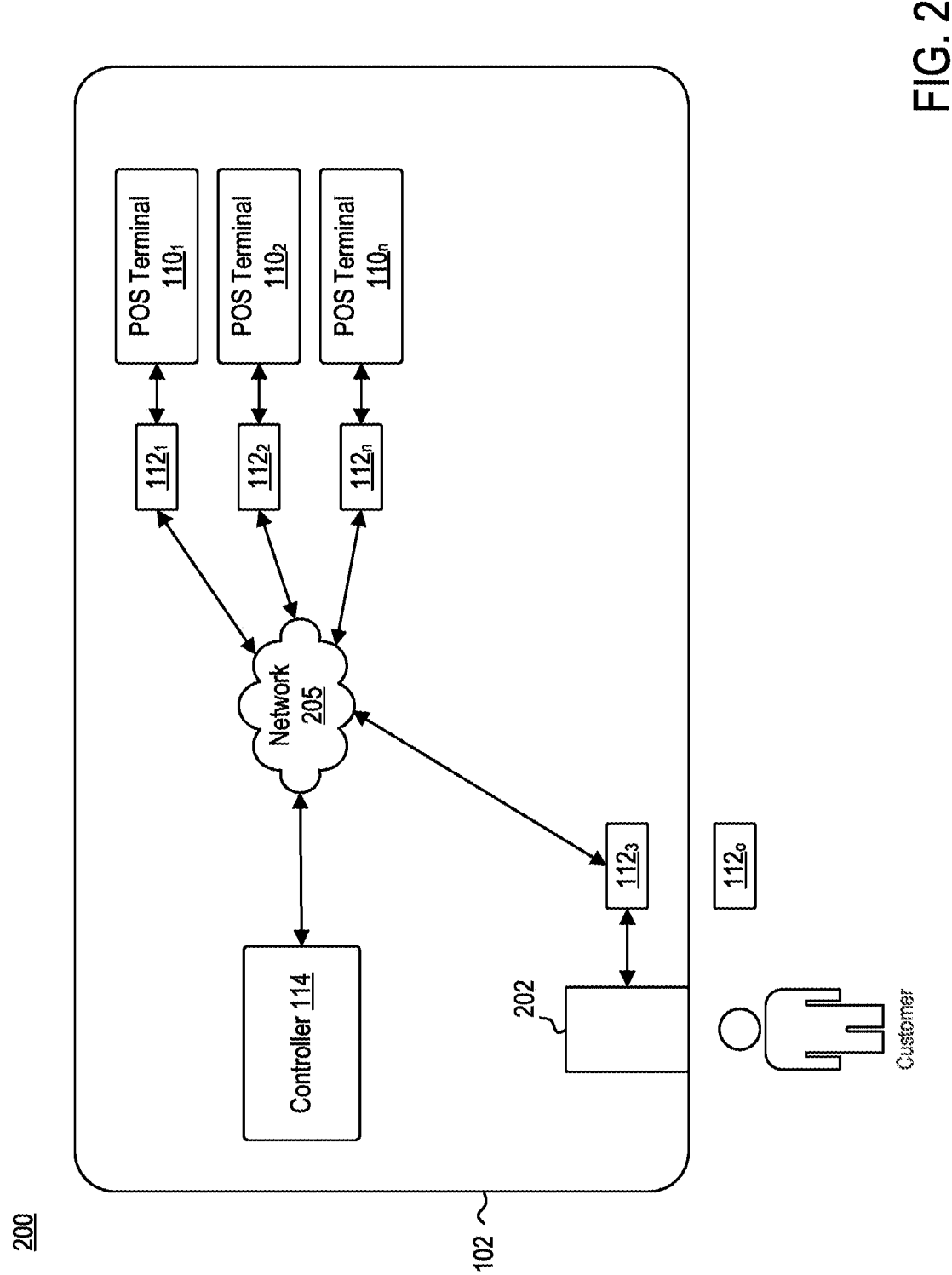
FIG. 2 is a block diagram illustrating one or more computing components positioned in a facility, according to one exemplary embodiment.

FIG. 2 is a block diagram 200 illustrating an exemplary facility 102, according to one embodiment. As illustrated, facility 102 may have an entrance 202. In some embodiments, one or more cameras 112 may be positioned exterior to facility 102. For example, camera $112_o$ may be positioned exterior to facility 102 and positioned to face entrance 202. Accordingly, camera $112_o$ may be configured to capture one or more streams of customer activity, as customers enter facility 102. As such, transaction agent 120 may be configured to predict a transaction of a customer as the customer enters facility 102, so that transaction agent 120 may communicate this predicted transaction to staff at facility 102. Accordingly, in some embodiments, the staff at facility 102 may being preparing the customer's transaction for a potential transaction.

As illustrated further, one or more computing components of computing environment 100 may be positioned within facility 102. Although FIG. 2 illustrates each of the foregoing components within facility 102, those skilled in the art may readily understand that one or more components may be positioned external to facility 102.

As shown, facility 102 may include POS terminal $110_1$, $110_2$, and $110_n$. Each POS terminal 110 may correspond to a particular camera 112. For example, camera $112_1$ may be configured to capture customer activity at POS terminal $110_1$, camera $112_2$ may be configured to capture customer activity at POS terminal $110_2$, and camera $112_n$ may be configured to capture customer activity at POS terminal $110_n$. In some embodiments, facility 102 may include one or more cameras 112 positioned to capture customer activity at a location separate from POS terminals 110. For example, as illustrated, camera 1123 may be positioned adjacent entrance 202.

Each camera 112 and POS terminal 110 may communicate with controller 114 via a local network 205. Local network 205 may be of any suitable type, including individual connections via the Internet, such as cellular or Wi-Fi networks. In some embodiments, local network 205 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Local network 205 may include any type of computer networking arrangement used to exchange data. For example, local network 205 may be the Internet, a private data network, virtual private network using a public network and/or other suitable connection(s) that enables components in and around facility 102 to send and receive information between the components of facility 102.

Figure 3:
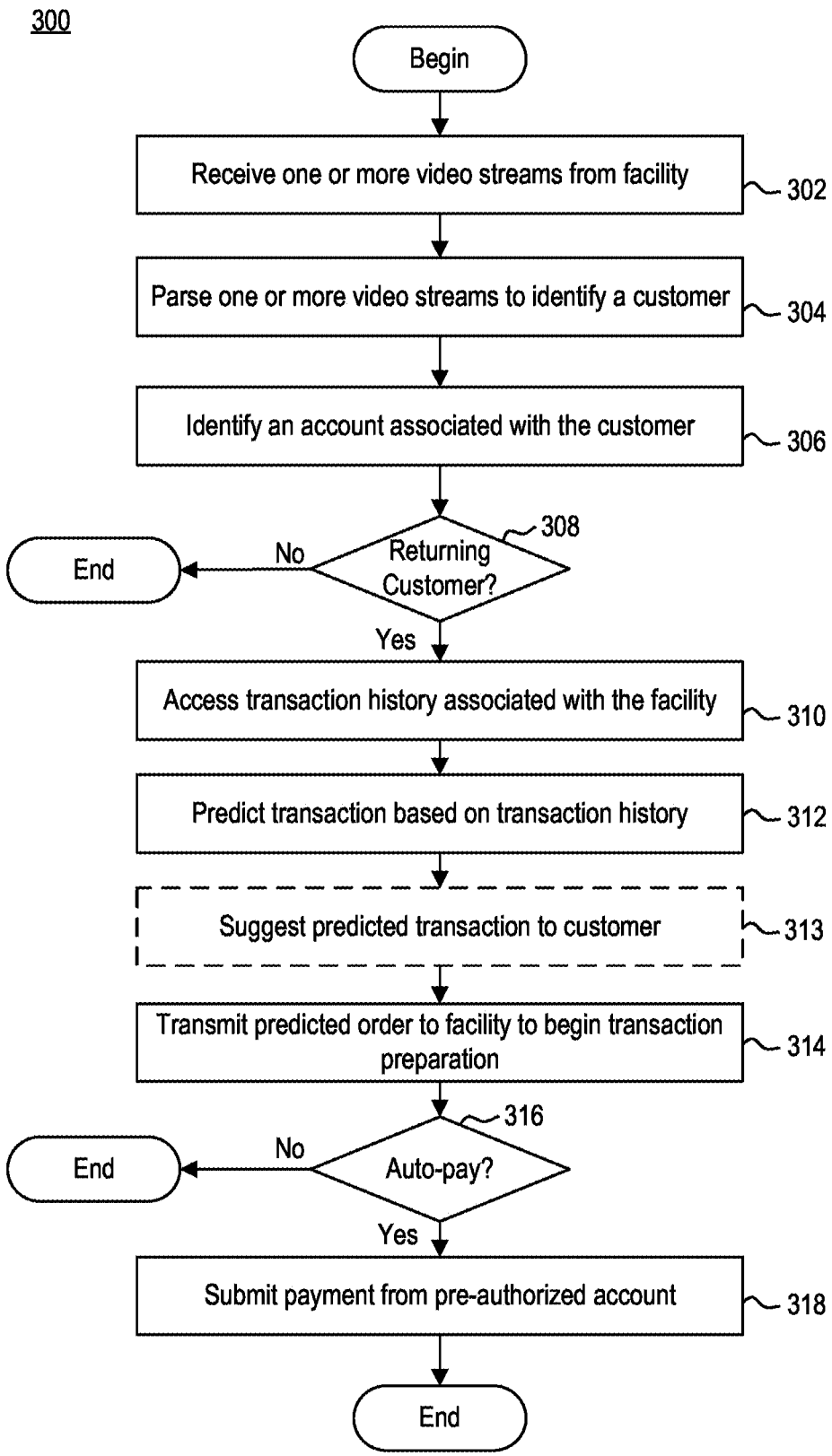
FIG. 3 is a flow diagram illustrating a method of customizing a customer experience, according to one exemplary embodiment.

FIG. 3 is a flow diagram illustrating a method 300 of customizing a customer experience, according to one exemplary embodiment. Method 300 may begin at step 302.

At step 302, organization computing system 104 may receive one or more streams of customer activity from facility 102. In some embodiments, organization computing system 104 may receive one or more streams of customer activity from controller 114. For example, controller 114 may receive one or more streams of customer activity via one or more cameras 112 positioned in or proximate to facility 102. In some embodiments, organization computing system 104 may receive one or more streams of customer activity directly from one or more cameras 112 positioned in or proximate to facility 102.

At step 304, organization computing system 104 may parse one or more video streams to identify a customer. For example, facial analysis agent 122 may parse one or more video streams to identify one or more facial features of each customer. Facial analysis agent 122 may query database 106 to determine whether any of the identified one or more facial features of a given customer match one or more facial features 128 stored in database 128. In some embodiments, facial analysis agent 122 may determine that a match does not exist. In these embodiments, facial analysis agent 122 may store the identified facial features 128 in database 106 to create a new customer account 128. In some embodiments, facial analysis agent 122 may determine that a match does indeed exist. Identifying a match with facial features 128 may reveal an identity of the given customer.

At step 306, organization computing system 104 may identify an account associated with the identified customer. For example, organization computing system 104 may backtrack from the identified facial features 128 to identify a customer account 126 associated therewith.

At step 308, organization computing system 104 may determine whether the customer is a returning customer to facility 102. For example, handler 118 may query database to retrieve all facilities 130 stored in database 106 and associated with customer account 126. Determining whether the customer is a returning customer, aids in predicting the customer's transaction at facility 102.

If, at step 308, organization computing system 104 determines that the customer is not a returning customer, the method 300 ends. If, however, at step 308, organization computing system 104 determines that the customer is a repeat customer, then method 300 proceeds to step 310.

At step 310, organization computing system 104 may access a transaction history of the customer associated with facility 102. For example, handler 118 may query database 106 to retrieve transaction information 134 stored thereon. Transaction information 134 may have been previously added to database 106 via handler 118 upon identifying a customer transaction via voice-to-text agent 124 or via one or more POS terminals 110. Transaction information 134 may include a date of each transaction, a time of each transaction, goods transferred during the transaction (e.g., food, movie theatre tickets, clothing, books, etc.), services rendered during the transaction (e.g., car wash, massage therapist, chiropractor, etc.), and the like.

At step 312, organization computing system 104 may predict a transaction based on at least transaction information 134. In some embodiments, handler 118 may provide as input to machine learning module 125 one or more items of transaction information 134. For example, the one or more items of transaction information 134 may include a date of each transaction, a time of each transaction, goods transferred during the transaction, services rendered during the transaction, and the like. In some embodiments, organization computing system 104 may also base the prediction on transaction information associated with other customers. For example, handler 118 may provide as input to machine learning module 125 one or more items of transaction information 134 associated with other customer profiles 126.

In some embodiments, method 300 may include step 313. At step 313, organization computing system 104 may interface with facility web server 154 to suggest a predicted transaction to the customer. For example, organization computing system 104 may instruct web server 154 to prompt application 155 to push a notification to the customer. The notification may include a suggested transaction, based on the transaction history of the user. Thus, the customer may be able to confirm the details of the transaction before organization computing system 104 instructs facility 102 to begin preparing the transaction. In some embodiments, if, after reviewing the notification, the customer does not agree with the predicted transaction, customer may request that facility web server 154 provide another suggestion or, in some cases, forego generating a prediction. Accordingly, facility web server 154 may relay the instructions from the customer to organization computing system 104. In some embodiments, if, after reviewing the notification, the customer agrees with the predicted transaction, customer may approve of the predicted order via application 155. Facility web server 154 may, in turn, relay the approval to organization computing system 104.

For the remainder of the operations discussed in FIG. 3, assume that the customer approves of the suggested, predicted order.

At step 314, organization computing system 104 may transmit the predicted transaction to facility 102. For example, organization computing system 104 may transmit the predicted transaction to facility 102 via controller 114. Transmitting the predicted transaction to facility 102 may allow employees of facility 102 to being preparing the transaction. In some embodiments, facility 102 may choose to confirm the transaction with the customer prior to preparation. In some embodiments, facility 102 may choose to confirm the customer is within facility 102 for a predetermined threshold of time, before beginning transaction preparation. For example, controller 114 of facility 102 may ping organization computing system 104. requesting an update as to whether the customer is still with facility 102.

At step 316, organization computing system 104 may determine whether the customer has pre-authorized an automatic payment feature. For example, organization computing system 104 may determine whether the customer has linked a financial account their customer profile, thereby authorizing payment therefrom.

If, at step 316, organization computing system 104 determines that the customer has pre-authorized an automatic payment feature, then method 300 ends, and the customer may pay at POS terminal 110. If, however, at step 316, organization computing system 104 determines that the customer has pre-authorized an automatic payment feature, then method 300 proceeds to step 318.

At step 318, upon determining that the customer has pre-authorized the automatic payment feature, organization computing system 104 may submit a payment from the pre-authorized account to facility 102.

Accordingly, facility 102 is able to begin preparation of a potential transaction with a given customer given the customer's transaction history at facility 102. Further, facility 102 is able to receive an automatic payment from organization computing system 104, when previously authorized by the customer. Such process improves the efficiency and customer throughput of facility 102, while simultaneously simplifying the transaction process for customers.

Figure 4:
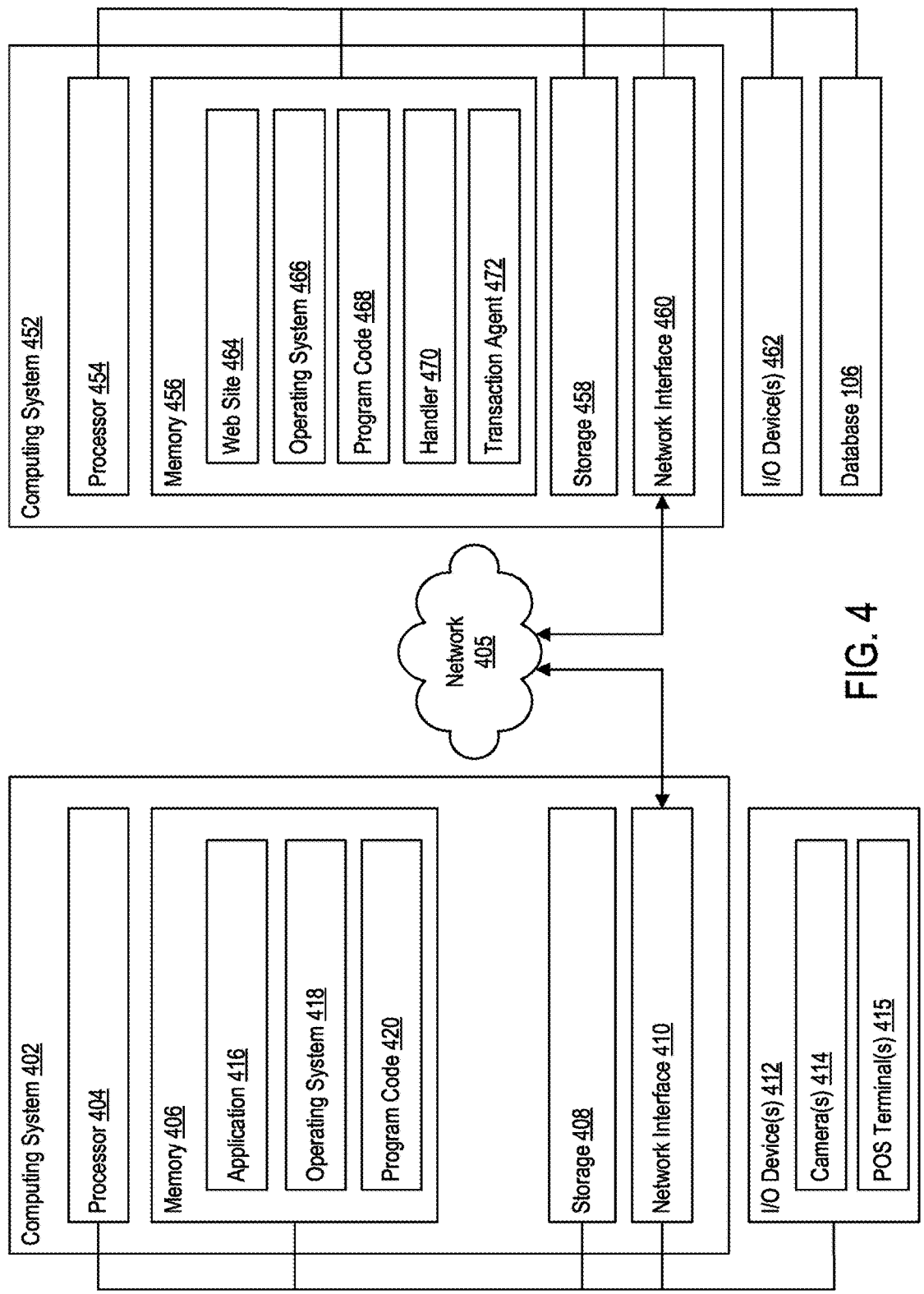
FIG. 4 is a block diagram illustrating a computing environment, according to one embodiment.

FIG. 4 is a block diagram illustrating an exemplary computing environment 400, according to some embodiments. Computing environment 400 includes computing system 402 and computing system 452. Computing system 402 may be representative of facility 102. Computing system 452 may be representative of organization computing system 104.

Computing system 402 may include a processor 404, a memory 406, a storage 408, and a network interface 410. In some embodiments, computing system 402 may be coupled to one or more I/O device(s) 412 (e.g., keyboard, mouse, etc.). Such I/O devices 412 may include, for example, one or more cameras 414 and one or more POS terminals 415.

One or more cameras 414 may be positioned within a facility. For example, one or more cameras 414 may be positioned to capture customers at each POS terminal 415. In some embodiments, at least one camera of the one or more cameras 414 may be positioned exterior to facility or located inside the facility, such that the camera captures customers entering and leaving the facility. Each POS terminal 415 may be representative of a general purpose computing device programmed to receive transactions from one or more customers and facilitate payment between the one or more customers and facility.

Processor 404 may retrieve and execute program code 420 (i.e., programming instructions) stored in memory 406, as well as stores and retrieves application data. Processor 404 may be included to be representative of a single processor, multiple processors, a single processor having multiple processing cores, and the like. Network interface 410 may be any type of network communications allowing computing system 402 to communicate externally via computing network 405. For example, network interface 410 is configured to enable external communication with computing system 452.

Storage 408 may be, for example, a disk storage device. Although shown as a single unit, storage 408 may be a combination of fixed and/or removable storage devices, such as fixed disk drives, removable memory cards, optical storage, network attached storage (NAS), storage area network (SAN), and the like.

Memory 406 may include application 416, operating system 418, and program code 420. Program code 420 may be accessed by processor 404 for processing (i.e., executing program instructions). Program code 420 may include, for example, executable instructions for communicating with computing system 452 to display one or more pages of website 464. Application 416 may enable a customer of computing system 402 to access a functionality of computing system 452. For example, application 416 may access content managed by computing system 452, such as website 464. The content that is displayed to a customer of computing system 402 may be transmitted from computing system 452 to computing system 402, and subsequently processed by application 416 for display through a graphical user interface (GUI) of computing system 402.

Computing system 452 may include a processor 454, a memory 456, a storage 458, and a network interface 460. In some embodiments, computing system 452 may be coupled to one or more I/O device(s) 462. In some embodiments, computing system 452 may be in communication with database 106.

Processor 454 may retrieve and execute program code 468 (i.e., programming instructions) stored in memory 456, as well as stores and retrieves application data. Processor 454 is included to be representative of a single processor, multiple processors, a single processor having multiple processing cores, and the like. Network interface 460 may be any type of network communications enabling computing system 452 to communicate externally via computing network 405. For example, network interface 460 allows computing system 452 to communicate with computer system 402.

Storage 458 may be, for example, a disk storage device. Although shown as a single unit, storage 458 may be a combination of fixed and/or removable storage devices, such as fixed disk drives, removable memory cards, optical storage, network attached storage (NAS), storage area network (SAN), and the like.

Memory 456 may include website 464, operating system 466, program code 468, handler 470, and transaction agent 472. Program code 468 may be accessed by processor 454 for processing (i.e., executing program instructions). Program code 468 may include, for example, executable instructions configured to perform steps discussed above in conjunction with FIG. 3. As an example, processor 454 may access program code 468 to perform operations for generating one or more rules exempt from a transaction hold. In another example, processor 454 may access program code 468 to perform operations for customizing a customer experience. Website 464 may be accessed by computing system 402. For example, website 464 may include content accessed by computing system 402 via a web browser or application.

Handler 470 may be configured to manage information stored in database 106. For example, handler 470 may be configured to update client information in database 106 when prompted by a user, when prompted by employees of the facility, or when prompted by another component of computing system 452.

Transaction agent 472 may be configured to predict a customer transaction prior to a customer arriving at, for example, a POS terminal 415. In some embodiments, transaction agent 472 may be configured to identify one or more users (or customers) using one or more video streams received from one or more cameras 414 positioned therein. For example, transaction agent 472 may be configured to parse through one or more video streams in real-time, to identify one or more customers arriving at (or already inside) facility, based on previously identified facial features stored in database 106. For example, in some embodiments, transaction agent 472 may match a customer's face to a customer in database 106 using three dimensional facial recognition methodologies, skin texture analysis methodology, or a combination of the same.

In some embodiments, transaction agent 472 may be configured to translate audible utterances of a customer to text for further analysis. In some embodiments, each POS terminal 415 may include a microphone to capture communications between a customer and an employee operation POS terminal 415. Transaction agent 472 may include software configured to provide text-based descriptions of audible input. Transaction agent 472 may parse the text-based description to identify one or more details of a customer's transaction at the facility. Transaction agent 472 may include a machine learning module configured to train a prediction model used by transaction agent 472 to predict details of a customer's future transaction. To train the prediction model, machine learning module may receive, as input, one or more streams of customer activity. The one or more streams of customer activity may correspond to previous transaction at given facilities. Such streams of activity may include the facility, the time of day, the day of the week, items purchased during the transaction, and the like. In some embodiments, machine learning module may further receiver, as input, one or more streams of activity associated with additional customers. As such, machine learning module may leverage both customer specific and customer agnostic information to predict details of a customer's transaction when, for example, the customer arrives at the facility.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of customizing a person experience, comprising:
   receiving, from a computing device positioned in a facility, one or more first video streams, captured by a first camera positioned at a location in the facility, the one or more first video streams capturing a person in the facility;
   accessing a database storing customer profiles, wherein each of the customer profiles comprises identity information, facial identification information, and account information;
   identifying, from the database, an identity of the person by parsing the one or more first video streams to identify one or more audio or visual cues of the person;
   determining, based on the identity of the person, that the person has taken one or more previous actions at the facility;
   analyzing the one or more previous actions at the facility to identify a pattern of personal activity at the facility;
   predicting, based on the identified pattern of personal activity in the one or more previous actions, an anticipated action for the person at the facility, wherein the anticipated action is associated with an account; and
   prompting, based on predicting the anticipated action and before the facility is instructed to begin preparing for a transaction, an application, of a client device of the person, to push a notification that suggests the transaction to the person.

2. The method of claim 1, further comprising notifying the computing device positioned in the facility to initiate one or more actions to address the anticipated action.

3. The method of claim 2, further comprising:
confirming that the person remains in the facility by:
receiving one or more second video streams captured by a second camera positioned at a second location in the facility; and
parsing the one or more second video streams to confirm that the person remains in the facility.

4. The method of claim 3, wherein the second location is proximate a point-of-sale terminal.

5. The method of claim 1, wherein predicting the anticipated action for the person at the facility comprises:
identifying a current day of the week;
identifying a current time of the current day; and
generating a prediction based on the identified pattern of personal activity in the one or more previous actions, the current day of the week, and the current time of the current day.

6. The method of claim 1, further comprising:
receiving a confirmation in response to the person viewing a confirmation message at a point-of-sale terminal; and
transmitting the confirmation to the computing device positioned in the facility.

7. The method of claim 1, wherein identifying the identity of the person comprises:
analyzing one or more facial features of the person; and
determining the identity of the person based on the one or more facial features.

8. The method of claim 1, further comprising:
receiving, from the client device and before the facility is instructed to begin preparing for the transaction, information regarding an approval of the transaction via the application.

9. A system comprising:
one or more processors; and
memory having programming instructions stored thereon, which, when executed by the one or more processors, performs operations comprising:
receiving one or more first video streams, captured by a first camera positioned at a location in a facility, of a person in the facility;
identifying an identity of the person by parsing the one or more first video streams to identify one or more audio or visual cues of the person;
determining, based on the identity of the person, that the person has taken one or more previous actions at the facility;
analyzing the one or more previous actions at the facility to identify a pattern of personal activity at the facility;
predicting, based on the identified pattern of personal activity, an anticipated action for the person at the facility; and
prompting, based on predicting the anticipated action and before the facility is instructed to begin preparing for a transaction, an application, of a client device of the person, to push a notification that suggests the transaction to the person.

10. The system of claim 9, wherein the operations further comprise:
generating a prediction model for predicting anticipated actions by learning, via one or more machine learning models, personalized habits at the facility.

11. The system of claim 9, wherein the operations further comprise:
notifying a computing device positioned in the facility to initiate one or more actions to address the anticipated action.

12. The system of claim 9, wherein the operations further comprise:
confirming that the person remains in the facility by:
receiving, from a computing device positioned in the facility, one or more second video streams captured by a second camera positioned at a second location in the facility; and
parsing the one or more second video streams to confirm that the person remains in the facility.

13. The system of claim 12, wherein the second location is proximate a point-of-sale terminal.

14. The system of claim 9, wherein predicting the anticipated action of the person at the facility comprises:
identifying a current day of a week;
identifying a current time of the current day; and
generating a prediction based on the current day of the week and the current time of the current day.

15. One or more non-transitory computer readable media including one or more instructions which, when executed by one or more processors, cause the one or more processors to perform operations comprising:
receiving, from a computing device positioned in a facility, one or more first video streams, captured by a first camera positioned at a location in the facility, of a person in the facility;
identifying an identity of the person by parsing the one or more first video streams to identify one or more audio or visual cues of the person;
determining, based on the identity of the person, that the person has taken one or more previous actions at the facility;
analyzing the one or more previous actions at the facility to identify a pattern of personal activity at the facility;
predicting, based on the identified pattern of personal activity, an anticipated action for the person at the facility; and
prompting, based on predicting the anticipated action and before the facility is instructed to begin preparing for a transaction, an application, of a client device of the person, to push a notification that suggests the transaction to the person.

16. The one or more non-transitory computer readable media of claim 15, wherein the operations further comprise:
generating a prediction model for predicting anticipated actions by learning, via one or more machine learning models, personalized spending habits at a facility.

17. The one or more non-transitory computer readable media of claim 15, wherein the anticipated action of the person at the facility comprises:
identifying a current day of the week;
identifying a current time of the current day; and
generating a prediction based on the one or more previous actions, the current day of the week, and the current time of the current day.

18. The one or more non-transitory computer readable media of claim 15, wherein the operations further comprise:
notifying the computing device positioned in the facility to initiate one or more actions to address the anticipated action.

19. The one or more non-transitory computer readable media of claim 18, wherein the operations further comprise:
confirming that the person remains in the facility by:
receiving, from the computing device positioned in the facility, one or more second video streams captured by a second camera positioned at a second location in the facility; and
parsing the one or more second video streams to confirm that the person remains in the facility.

20. The one or more non-transitory computer readable media of claim 15, wherein identifying the identity of the person comprises:
analyzing one or more facial features of the person; and
determining the identity of the person based on the one or more facial features.

* * * * *